(12) United States Patent
Matama (10) Patent No.: US 6,272,293 B1
(45) Date of Patent: Aug. 7, 2001

(54) ORDER INFORMATION RECORDING SYSTEM AND PHOTOGRAPHIC IMAGE PROCESSING METHOD

(75) Inventor: Toru Matama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/357,983

(22) Filed: Jul. 21, 1999

(30) Foreign Application Priority Data

Jul. 21, 1998 (JP) .................................................. 10-204825

(51) Int. Cl.⁷ ..................................................... G03B 29/00
(52) U.S. Cl. .......................... 396/208; 396/310; 396/311; 396/429
(58) Field of Search ..................................... 396/207, 208, 396/311, 321, 310, 429, 511, 512, 515

(56) References Cited

U.S. PATENT DOCUMENTS 6,047,140 * 4/2000 Yoshikawa ........................... 396/310

* cited by examiner

Primary Examiner—W. B. Perkey
(74) Attorney, Agent, or Firm—Sughrue, Mion, Zinn, Macpeak & Seas, PLLC (57) ABSTRACT

In a case in which simultaneous printing is to be carried out, thumbnail image data is recorded onto an IC chip which is provided at a cartridge loaded in a camera. A control section reads the thumbnail image data from the IC chip and outputs the data to a personal computer via an I/F section. A user designates order information for each frame image while viewing an order information setting screen of the personal computer. Designated order information is transmitted to the camera via a serial port of the personal computer. The control section records received order information onto the IC chip. In a case in which reprinting is to be carried out at a laboratory, a printing process is performed on the basis of the order information recorded on the IC chip. With this arrangement, a customer need not designate order information at a shop.

26 Claims, 7 Drawing Sheets

ORDER INFORMATION RECORDING SYSTEM AND PHOTOGRAPHIC IMAGE PROCESSING METHOD

BACKGROUND OF THE INVENTION

1. Field of the Invention

The present invention relates to an order information recording system and a photographic image processing method, and in particular, to an order information recording system in which order information can be recorded on the basis of an image recorded on a photographic photosensitive material on which images are recorded, and to a photographic image processing method in which image processing of an image recorded on a photographic photosensitive material can be performed on the basis of order information.

2. Description of the Related Art

A conventional digital printing system is known in which a frame image recorded on a photographic film is read by a sensor such as a charge-coupled device (CCD) to obtain digital image data of the frame image, and then printing processing is conducted on the basis of the obtained digital image data.

Putting such a digital printing system to practical use provides additional degrees of freedom in image processing, and enables various types of high quality printing by the designation of order information such as, for example, the number of prints, the aspect ratio, instructions for trimming, various kinds of finishing processing such as black-and-white finishing, sepia finishing, slender-look finishing or soft focus, instructions for template processing, and the addition of characters. Especially in reprinting, there is a strong demand for various types of high quality printing for each image frame.

Since it is inconvenient, however, to designate such order information at a laboratory, there is a great demand for designating order information at home. Moreover, it is even more convenient for a customer if he/she can designate order information for simultaneous printing as well as for reprinting.

SUMMARY OF THE INVENTION

In view of the aforementioned, it is an object of the present invention to provide an order information recording system which enables designation of order information even at home, and a photographic image processing method in which image processing of an image recorded on a photographic photosensitive material can be carried out on the basis of order information.

A first aspect of the present invention is an order information recording system comprising: reading means for reading information, which is required for designating order information, from a storage element which is provided at a cartridge accommodating a photographic photosensitive material and on which the information required for designating order information is recorded in advance; displaying means for displaying the information required for designating order information, which information was read by said reading means; setting means for setting order information on the basis of the information required for designating order information, which information is displayed by said displaying means; and order information recording means for recording the order information set by said setting means on the storage element in correspondence with the information required for designating order information, which information is recorded on the storage element.

A second aspect of the present invention is an order information recording system comprising: recording means for recording information, which is required for designating order information in accordance with an image recorded on a photographic photosensitive material, on a storage element provided at a cartridge which accommodates the photographic photosensitive material; reading means for reading from the storage element the information required for designating order information, which information was recorded by said recording means; displaying means for displaying the information required for designating order information, which information was read by said reading means; setting means for setting order information on the basis of the information required for designating order information, which information is displayed by said displaying means; and order information recording means for recording the order information set by said setting means on the storage element in correspondence with the information required for designating order information, which information is recorded on the storage element.

A third aspect of the present invention is an order information recording system comprising: recording means for recording on a storage medium information required for designating order information in accordance with an image recorded on a photographic photosensitive material; reading means for reading from the storage medium the information required for designating order information, which information was recorded by said recording means; displaying means for displaying the information required for designating order information, which information was read by said reading means; setting means for setting order information on the basis of the information required for designating order information, which information is displayed by said displaying means; and order information recording means for recording, on a storage element provided at a cartridge accommodating the photographic photosensitive material, the order information set by said setting means together with the information required for designating order information which information was read by said reading means.

A fourth aspect of the present invention is the order information recording system according to the first or the second aspect of the invention, wherein the information required for designating order information is image data corresponding to the image recorded on the photographic photosensitive material.

A fifth aspect of the present invention is the order information recording system according to one of the second to the fourth aspects of the invention, wherein the recording means is included in a camera which records a photographed image on the photographic photosensitive material or in a scanner which reads a photographed image recorded on the photographic photosensitive material, and said recording means photoelectrically converts the photographed image so that the photographed image is recorded as electronic image data.

A sixth aspect of the present invention is a photographic image processing method in which an image recorded on a photographic photosensitive material is processed on the basis of order information recorded by an order information recording system according to one of the first to the fifth aspects of the invention.

According to the first aspect of the present invention, the reading means reads information required for designating order information from the storage element such as an IC, which is provided at a cartridge accommodating a photographic photosensitive material. The information required for designating order information includes the frame number of an image recorded on a photographic photosensitive material, image data, and the like.

Moreover, the information required for designating order information may be recorded by the recording means in correspondence with an image recorded on a photographic photosensitive material, as in the second aspect of the present invention. Further, information may be recorded by the recording means onto a storage medium such as a memory card instead of a storage element which is provided at a cartridge accommodating a photographic photosensitive material, as in the third aspect of the invention.

Then, the read information is displayed by the displaying means. Next, the order information is set by a setting means on the basis of the information displayed by the displaying means and required for designation of the order information. The set order information is recorded by the order information recording means on the storage element provided at the cartridge accommodating the photographic photosensitive material, with the order information corresponding to the information required for designating order information.

The setting of the order information by the setting means is carried out, for example, by a personal computer in which software for setting order information is installed. In this case, a reading means, such as an IC reader or a memory card drive for reading information recorded on a storage element such as an IC or a memory card, reads the information required for designating order information. The information is displayed on a displaying means such as a monitor of the personal computer, thereby permitting the setting of order information.

The set order information is then recorded by an order information recording means, such as an IC writer, according to instructions given by the personal computer. At this time, it is preferable that the information required for designating order information is image data corresponding to the image recorded on the photographic photosensitive material, as in the fourth aspect of the invention. This arrangement allows the user to set order information while visually confirming the photographed image on the monitor of the personal computer.

Image data can be obtained in a digital laboratory system in which, for example, an image recorded on a photographic photosensitive material is read digitally and a printing process is conducted for the image. The information required for designating order information is not limited to image data, and information such as the frame number or the like may alternatively be used. The frame number is recorded, for example, at the time of photographing with a camera.

The reading means and the order information recording means may be included in a camera which records images on a photographic photosensitive material. In such a case, image data is obtained at a digital laboratory system, and is recorded onto a storage element provided at the cartridge, and the cartridge is then loaded into a camera. The camera is connected to a personal computer, and the image data recorded on the storage element is read and sent to the personal computer upon instruction from the personal computer. An image based on this image data is displayed on a screen of the personal computer, and the order information can be set. The set order information is then sent to the camera and is written in the storage element of the cartridge. The image frames which have order information set therefor are then subjected to image processing at, for example, a lab, on the basis of the order information recorded on the storage element, as in the sixth aspect of the invention. Next, printing processing is carried out onto, for example, photographic printing paper. With this arrangement, the customer need not designate the order information at the shop. The image-processed data may be recorded on a recording medium such as a CD-R, MO or the like, instead of being used for printing processing onto photographic printing paper.

All of these reading means, setting means and order information recording means may be provided at the camera.

Moreover, a recording means may be included in the camera or in a scanner for reading photographed images recorded on photographic photosensitive materials, as in the fifth aspect of the invention. The recording means in this case photoelectrically converts a photographed image, and records the data as electronic image data on a storage medium such as a memory card or a storage element such as an IC provided at the cartridge. With this arrangement, image data is produced simultaneously with photographing, and is recorded on a storage element of the cartridge or a memory card. This allows designation of order information before simultaneous printing. Thus, costs can be reduced by, for example, designating the frames which need not be printed.

DESCRIPTION OF THE PREFERRED EMBODIMENTS

Figure 1:
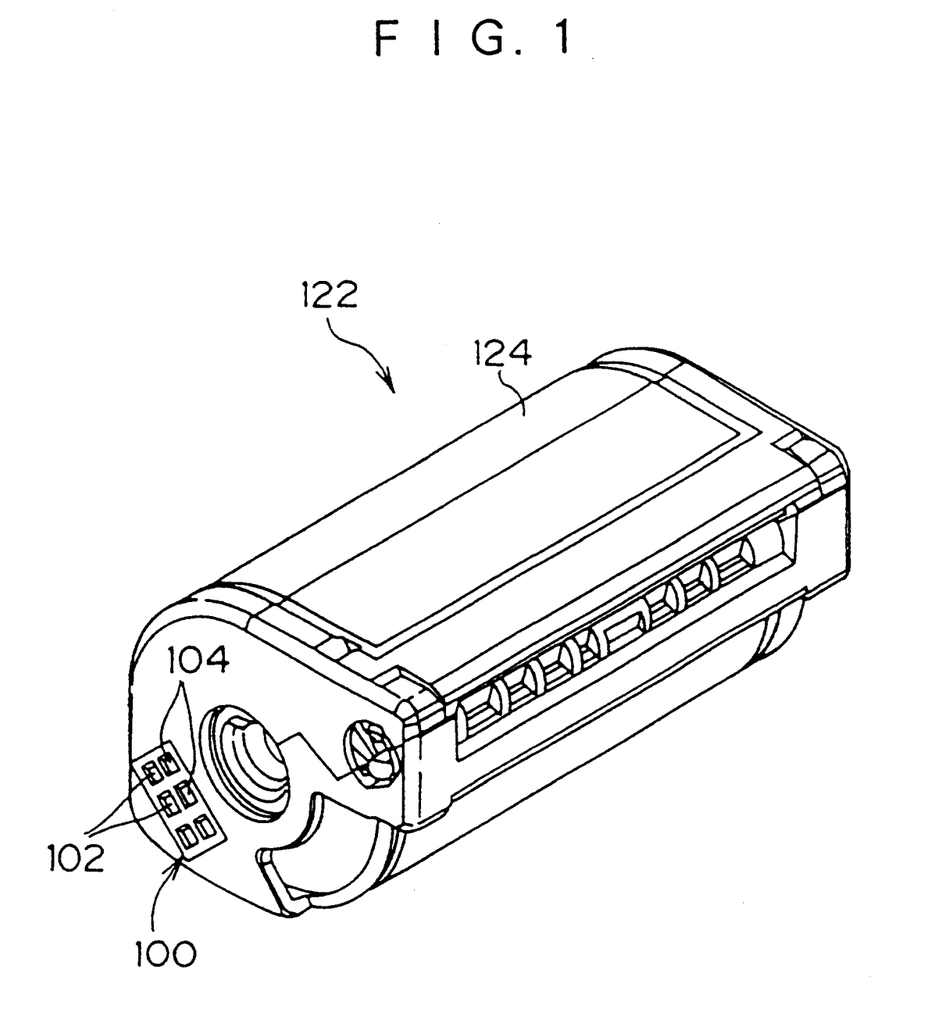
FIG. 1 is a perspective view of a cartridge relating to a first embodiment of the present invention.
Figure 2:
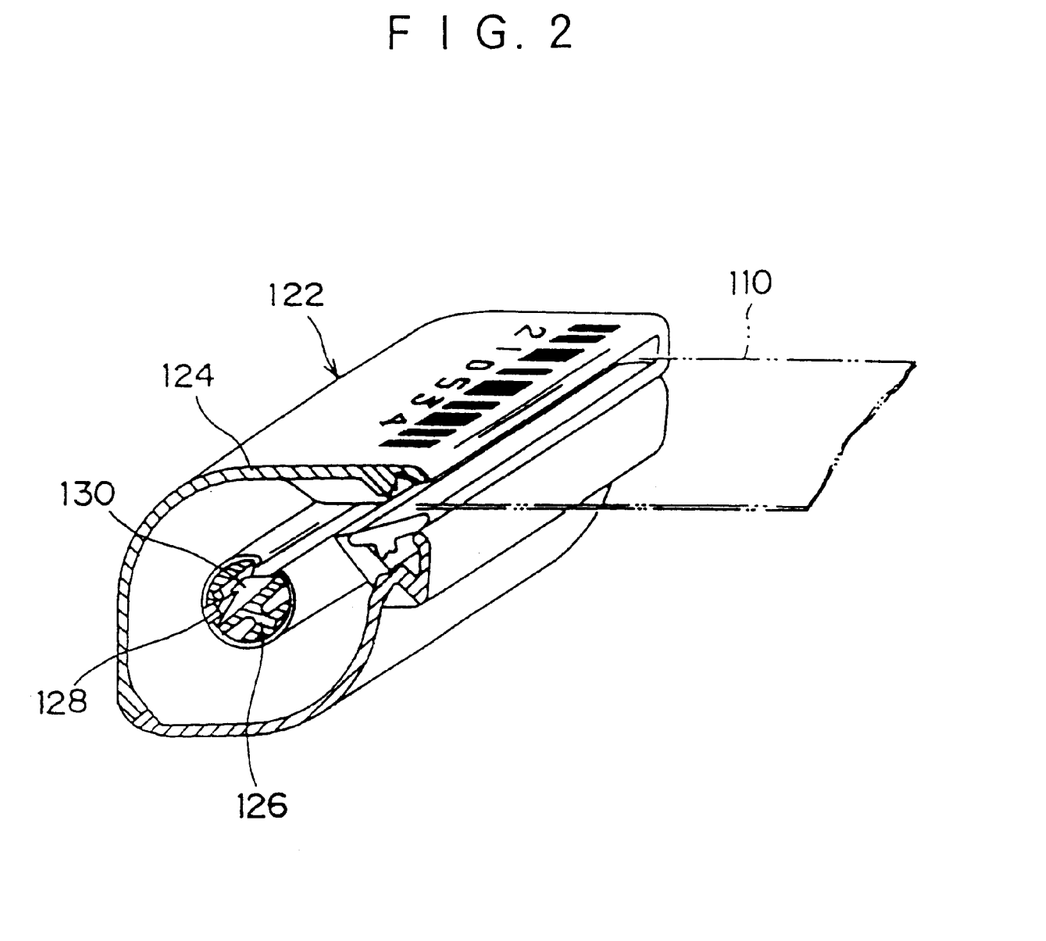
FIG. 2 is a perspective view of the cartridge illustrated in FIG. 1 with a portion of a casing broken for the purpose of illustration of an inside structure thereof.

FIG. 1 and FIG. 2 illustrate a cartridge 122 which is applied to a first embodiment of the present invention.

Within a casing 124 of the cartridge 122, there is provided a spool 126 which takes up a negative film 110 (see FIG. 2) in a roll form so that the negative film 110 is accommodated in the cartridge 122.

Figure 3:
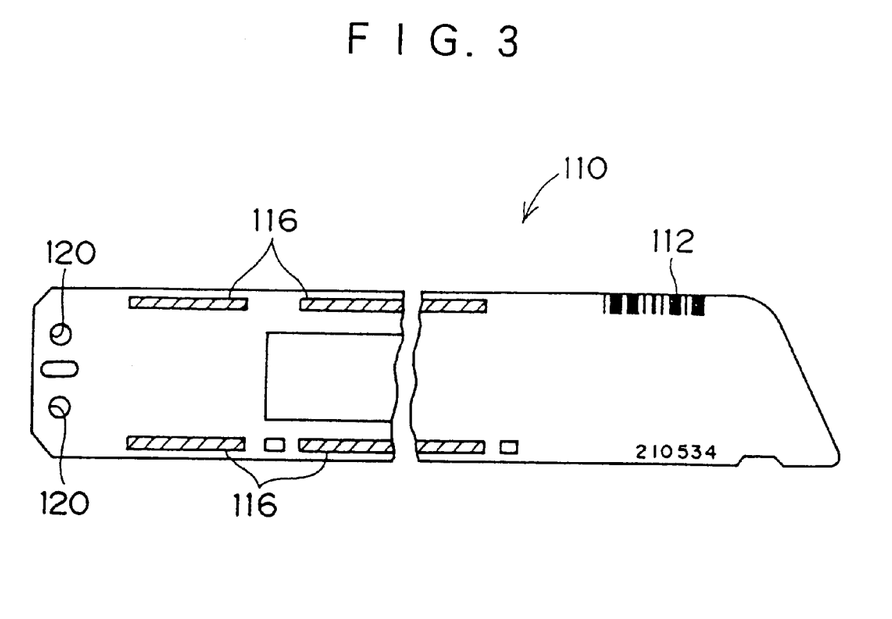
FIG. 3 is a plan view of a negative film (which is adapted to APS printing).

As illustrated in FIG. 3, a magnetic recording layer 116 is provided at the negative film 110. Moreover, optical information (in the form of a bar code 112) is recorded on the negative film 110. The bar code 112 represents a negative film ID (hereinafter referred to as "film ID").

As illustrated in FIG. 2, a slit-shaped through hole 128 is formed at the spool 126 along the axial direction of the spool 126. Projecting pawls 130 are formed at an inner peripheral surface of the through hole 128. Holes 120 (see FIG. 3) formed in the negative film 110 fit together with these projecting pawls 130. The trailing end portion of the negative film 110 is thereby connected to the spool 126, and the negative film 110 can be taken up in a roll form. A cartridge ID is recorded in advance on the outer peripheral surface of the cartridge 122 in the form of a bar code or letters (or numbers). This cartridge ID basically matches the film ID.

An axial end of the spool 126 is rotated to allow the negative film 110 to be taken in and out of the cartridge 122.

As shown in FIG. 1, an IC chip 100 serving as a storage medium is embedded in the cartridge 122 of the present first embodiment. A plurality of terminals 102 (six in the present embodiment) are provided on the IC chip 100. The body of the IC chip 100 is embedded while the terminals 102 are exposed through rectangular openings 104 which are provided in correspondence with the respective terminals 102 at one end surface of the cartridge 122.

Digital image data (hereinafter referred to as "thumbnail image data") of an image recorded on the negative film 110 accommodated within the cartridge 122 may be recorded on the IC chip 100. This thumbnail image data is data of an image which has been read at a relatively low resolution in a scanner section 210 (see FIG. 4) of a laboratory system which will be described later.

Along with the aforementioned thumbnail image data, order information may be recorded on the IC chip 100. Examples of order information include the print size, the aspect ratio, instructions for trimming, finishing processings (for example, black-and-white finishing, sepia finishing, slender-look finishing, soft focus, high key (adding a white color component throughout the image to give the image a fairy-tale-like feel) or the like), template processing (adding of predetermined shapes or characters to a part of or the outer periphery of a photograph), the addition of characters (e.g., adding a message) and the like.

Figure 4:
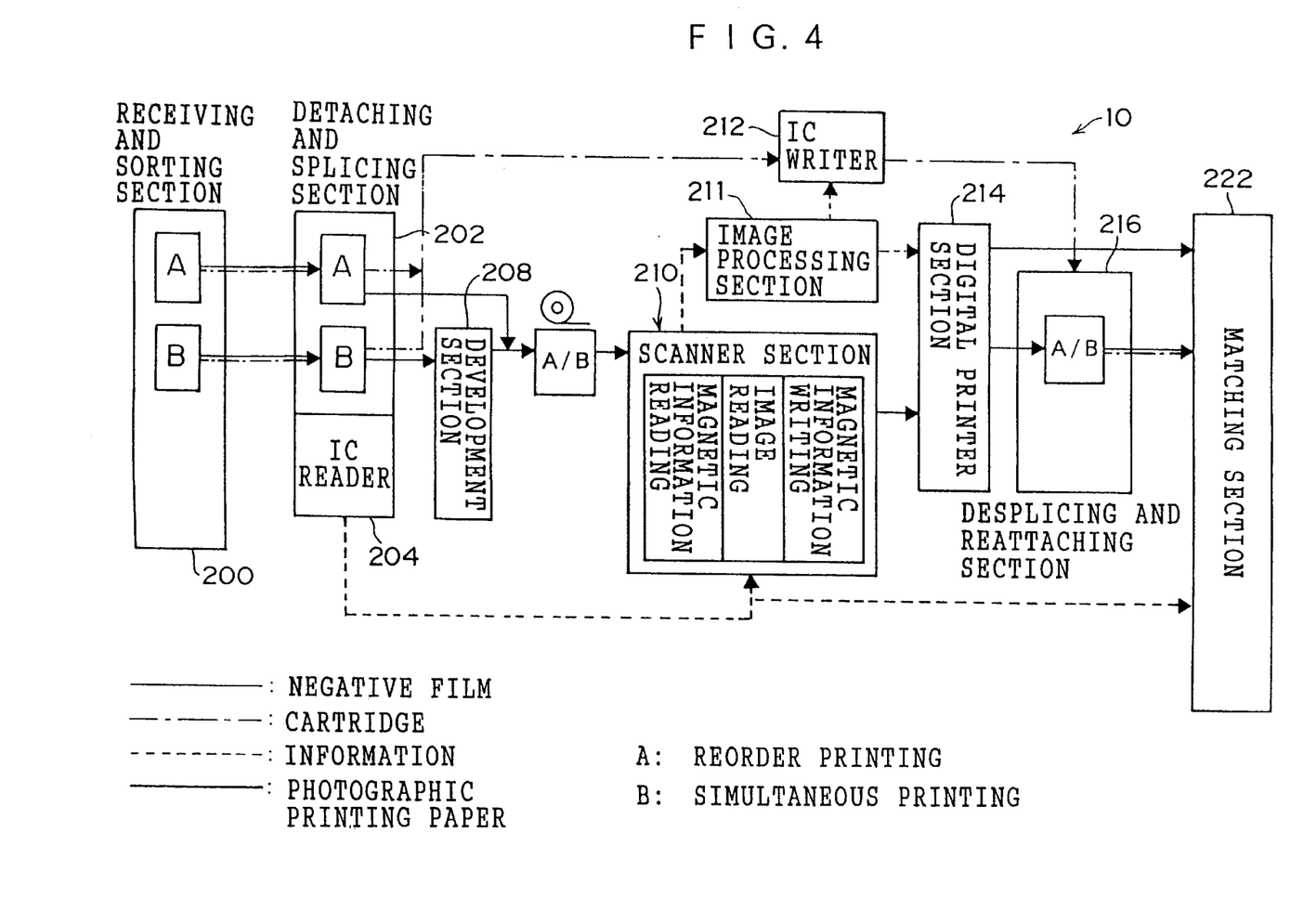
FIG. 4 is a schematic structural view of a laboratory system relating to the first embodiment of the invention.

FIG. 4 is a process diagram of the laboratory system 10 relating to the present first embodiment. In this laboratory system 10, the cartridge 122 is first conveyed to a receiving and sorting section 200, and then the subsequent procedures are determined according to whether simultaneous printing or reorder printing is to take place.

At the receiving and sorting section 200, cartridges 122 are sorted into two different types: those designated in the figures and hereinafter by reference numeral A (i.e., cartridge 122 accommodating negative films 110 which are to be subjected to reorder printing) and those designated by reference numeral B (i.e., cartridges 122 accommodating negative films 110 which are to be subjected to simultaneous printing). Then, the cartridge 122 is conveyed to the first process at a detaching and splicing section 202.

At the detaching and splicing section 202, the negative film 110 is withdrawn from the cartridge 122, and the trailing end portion of the negative film is detached from the spool 126. Then, a plurality of negative films 110 are spliced into an elongated form to form a roll film. Developed negative films 110 (for reorder printing) and undeveloped negative films 110 (for simultaneous printing) are spliced separately from each other, i.e., developed and undeveloped negative films 110 are not spliced together.

An IC reader 204 is provided at the detaching and splicing section 202. The IC reader 204 has the function of reading information from the IC chip 100 provided at the cartridge 122, i.e., the IC reader 204 reads aforementioned order information and the like.

At the detaching and splicing section 202, the cartridge ID is read from the cartridge 122 from which the negative film 110 is removed. The cartridge ID is stored, as a part of a set together with the information which was read by the IC reader 204, on an LSI card (not shown) which is conveyed through each process. When there are requests for special prints (such as composite photographs or the like), information to that effect is also recorded.

The transmission of information between each process is not limited to use of the LSI card, and instead, the magnetic recording layer 116 of the negative film 110 may be used. Or, information may be directly transmitted to a predetermined process (the next process, generally) as on-line data.

The undeveloped negative films 110 which have been spliced into a roll-shape are then conveyed to a negative development section 208 where the negative films 110 are subjected to developing in a known negative film development apparatus, and are then conveyed to the next step, a scanner section 210.

The main work of the scanner section 210 is to digitally read the image recorded on the negative film 110. Here, a thumbnail image is generated on the basis of the read digital data. It is sufficient for the thumbnail image to be read at a relatively low resolution since the purpose of the thumbnail image is to allow understanding of what kind of image is recorded at each image frame.

When the roll-shaped negative film 110 is loaded in a predetermined position, the negative film 110 is drawn out from the uppermost layer thereof. The information recorded on the magnetic recording layer 116 is read and the information recorded on the IC chip 100 is read from the LSI card. A film ID is recorded optically on the negative film 110. At the scanner section 210, this film ID is read, and information is retrieved on the basis of the read film ID. This retrieval enables the corresponding information to be obtained from the LSI card, and enables a determination as to whether information is recorded in the IC chip 100 and a determination as to whether requests for special prints (such as composite photographs or the like) are included among the information recorded in the IC chip 100.

When the above-described processes (mainly, the reading of the information) are completed, at the scanner section 210, each image frame is read at a high resolution. The read images are then outputted to an image processing section 211.

On the basis of the order information read by the IC reader 204, the image processing section 211 conducts image processing on the image data read at the scanner section 210. The processed image data is then outputted into a digital printer section 214. The image data which was read at the scanner section 210 at a low resolution can be recorded onto the IC chip 100 of the cartridge 122 as a thumbnail image by an IC writer 212.

The digital printer section 214 prints out the image data outputted from the image processing section 211 onto unillustrated photographic printing paper. For this printing, a scanning-recording type printing may be utilized in which, while the laser beam is oscillated in the main scanning direction by, for example, a polygon mirror, the photographic printing paper is conveyed so as to be exposed in accordance with the image data. During the printing operation in this digital printer section 214, the photographic printing paper is set in the main body of the printer in a state in which it is wound in a roll-shape and accommodated within a magazine.

The rolled negative films 110 are conveyed to the next process, a desplicing and reattaching section 216 after the printing process has been completed.

The image data may be recorded on a recording medium such as a CD-R, MO or the like, instead of being printed on a photographic printing paper.

The cartridge magazine is conveyed into the desplicing and reattaching section 216 where the film IDs recorded on the negative films 110 wound in a roll are read. Then, the film IDs are matched with the cartridge IDs recorded on the cartridges 122 so that each negative film 110 is accommodated into the corresponding cartridge 122.

Therefore, the cartridges 122 are accommodated into another cartridge magazine in the order in which the negative films 110 were spliced together.

Therefore, the order in which the negative films 110 are removed from the roll of spliced-together negative films 110 corresponds with the order in which the cartridges 122 are arranged, thereby allowing the desplicing and reattaching operations to be carried out smoothly.

In the case in which a negative film requiring special printing is included in the roll of negative films 110 and information to that effect is recorded on the LSI card in the detaching and splicing section 202, the operator is informed of this fact visually (e.g., by a display) or aurally (e.g., by a buzzer) during the desplicing of the negative films 110.

At a matching section 222, the negative film 110, the cartridge 122 which accommodates the negative film 110, and the photographic printing papers are gathered together and put into a DP bag (not shown) with the IDs respectively applied thereto being confirmed to match, and then the DP bag is given to the customer.

Figure 5:
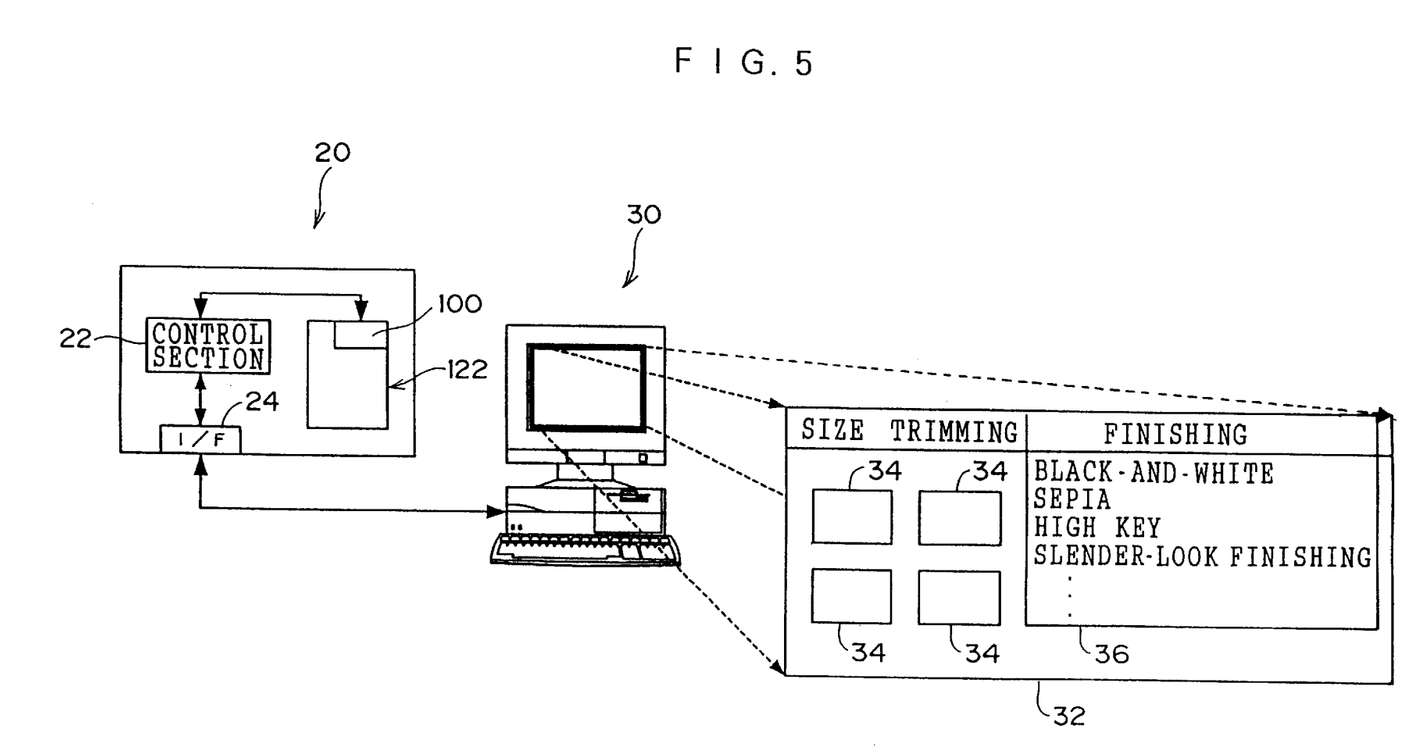
FIG. 5 is a schematic structural view of a camera and a personal computer for designating order information relating to the first embodiment of the invention.

FIG. 5 schematically illustrates the arrangement of a camera 20 and a personal computer 30 for designating the order information by a customer from his/her home. A control section 22 is provided in the camera 20. The control section 22 can read information recorded on the IC chip 100 provided at the IC cartridge 122, and can write information into the IC chip 100. The control section 22 is connected to an interface (I/F) section 24 for data communication with the personal computer 30. The structures of the main portions of the camera, such as the photographing lens, are not described herein for the purpose of simplifying the explanation.

The I/F section 24 can be connected via a serial cable to a port of a serial interface (e.g., RS-232C) provided at the personal computer 30. Thus, the control section 22 reads the thumbnail image data recorded on the IC chip 100 at the laboratory system 10, and can transmit the read image to the personal computer 30 via the I/F section 24.

A software, which displays the thumbnail image transmitted from the camera 20 on a display thereby allowing the user to designate order information as he/she likes for each frame image, is installed in advance in the personal computer 30. The designated order information can be outputted to the camera 20 via the serial interface, and at the control section 22, the order information outputted from the personal computer 30 can be recorded on the IC chip 100.

When the user has images reprinted, at the laboratory system 10, the order information recorded on the IC chip 100 is read and printing processing based on the order information is carried out.

The communication means between the camera 20 and the personal computer 30 is not limited to the RS-232C, and a serial bus or an interface such as an IEEE1394 may be employed instead.

Operation of the present first embodiment will be described hereafter.

First, the customer takes the cartridge 122 which has been photographed with the camera 20 to a DPE shop. As shown in FIG. 4, two types of the cartridge 122 are received: cartridges 122 represented by reference numeral A whose negative films 110 are to be subjected to reorder printing, and cartridges 122 represented by reference numeral B whose negative films 110 are to be subjected to simultaneous printing.

At the detaching and splicing section 202, the negative films 110 accommodated in the cartridges 122 are spliced into roll forms in the order of receipt and respectively for reference numerals A and B. The reference numeral B (simultaneous printing) roll of negative films 110 is conveyed to the scanner section 210 after development at the development section 208. The reference numeral A (reorder printing) roll of negative films 110 skips the development section 208 and is conveyed directly to the scanner section 210.

At the scanner section 210, the magnetic information of the rolled negative films 110 which were conveyed in is read. In the case of simultaneous printing, all of the image frames are read at a low resolution. In the case of reorder printing, the necessary image frames are selected and read at a low resolution. In both cases, the read image data is outputted to the image processing section 211.

For the simultaneous printing, the image processing section 211 outputs the image data which was read at a low resolution to the IC writer 212 as thumbnail image data. The IC writer 212 then records the thumbnail image data on the IC chip 100 of the cartridge 122.

Then, at the scanner section 210, exposure correction information for the image frames to be printed is obtained, and the images are read at a high resolution. The image data is transmitted to the image processing section 211, and this exposure correction information is written onto the magnetic recording layer 116.

At the image processing section 211, the image data is subjected to image processing in accordance with the order information read from the IC chip 100 by the IC reader 204. The image processing section 211 then outputs the processed image data to the digital printer section 214.

At the digital printer section 214, images are subjected to printed-exposing processing onto a photographic printing paper on the basis of the image data transmitted from the image processing section 211 and the exposure correction information. Then, the rolled negative films 110 are conveyed to the desplicing and reattaching section 216 in order of completion of the printing exposure processing.

The cartridge 122, from which the negative film 110 was separated, is conveyed in advance to the desplicing and reattaching section 216.

The negative film 110 is then accommodated into the cartridge 122, and the cartridge 122 and the photographic printing papers are conveyed into the matching section 222 together. At the matching section 222, the photographic materials (the cartridge 122 and the photographic printing papers) are put into development bags and returned to the customers.

The following is a description of a case in which a user designates order information at home when he/she wants to reprint film images As shown in FIG. 5, the cartridge 122 which was subjected to simultaneous printing and returned to the customer is firstly loaded in the camera 20. Then, the personal computer 30 is started up and the software for designating the order information is also started up so that an order information setting screen 32 is displayed on the monitor of the personal computer 30. Then, the camera 20 and the personal computer 30 are connected via a serial cable.

When the user (the customer) carries out a predetermined operation on the personal computer 30 and sends a command requesting the thumbnail image data to the camera 20, the control section 22 of the camera 20 receives the request command via the I/F section 24, reads the thumbnail image data from the IC chip 100, and sends the thumbnail image data to the personal computer 30. In this way, several frame images 34 (four in FIG. 5) are displayed on the order information setting screen 32.

Then, while viewing the frame images 34, the user designates the order information such as a designation of the frames which need not to be printed, the print size, the aspect ratio, instructions for trimming, finishing processing, template processing, addition of characters, and the like. For example, when the user selects the finishing processing, a pull-down menu 36 is displayed as shown in FIG. 5, thereby allowing the user to select the finishing processing such as black-and-white processing, the sepia processing, high key, slender-look finishing, and the like.

The order information for each frame is thus designated and transmitted to the camera 20 by a predetermined operation. At the control section 22 of the camera 20, the received order information is recorded onto the IC chip 100. Then, the user removes the IC cartridge 122 from the camera and takes it to the DPE shop for reprinting. Because the order information is already recorded on the IC chip 100 at this point, the customer need not designate the order information at the shop. Then, the reprinting is conducted according to the above-described procedures.

Providing a means for communication between the camera 20 and the personal computer 30 enables the user to designate the order information on the personal computer 30, which saves him/her the time and labor involved in filling out the complicated order information on the order bag at the shop. Moreover, the above-described method in which the user sets the cartridge accommodating the developed photographic film into the camera to designate the order information for reprinting is low-cost, since this method requires the customer to purchase only the serial cable for connecting the camera and the personal computer and the software for designating the order information, because most of the personal computers are provided with a serial port.

Instead of the camera, a device may be utilized wherein a cartridge accommodating a developed photographic film is set in the device, and the device can read and write the thumbnail image data and the order information by communication with a personal computer. Such an arrangement makes it unnecessary for the user to remove the cartridge already loaded in the camera and then set in the camera the cartridge for which he/she wants to designate the order information.

The thumbnail image data may be recorded by a film scanner instead of being recorded at a laboratory system.

Figure 6:
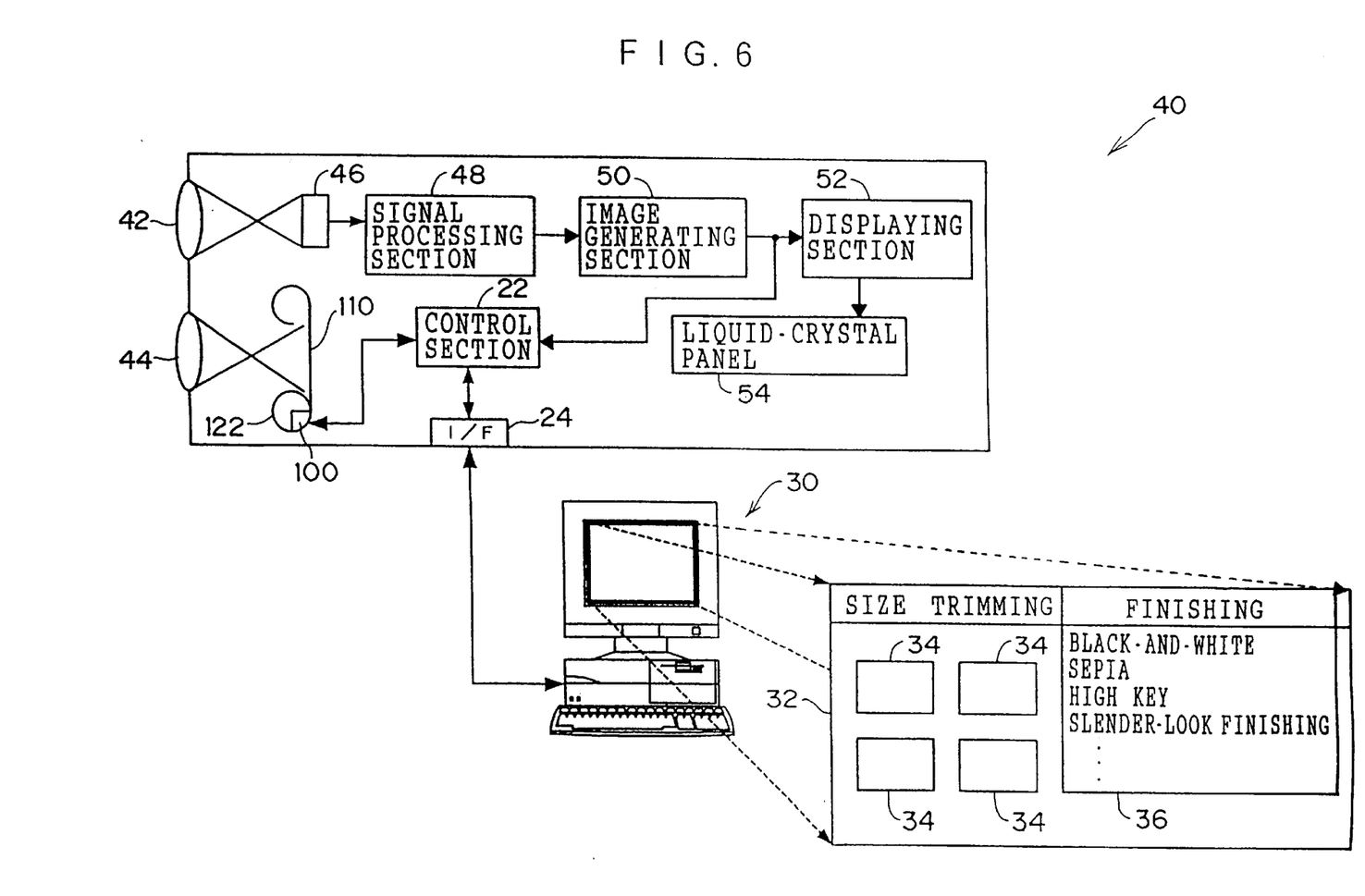
FIG. 6 is a schematic structural view of a camera and a personal computer for designating order information relating to a second embodiment of the invention.

FIG. 6 shows the arrangement of a camera 40 and the personal computer 30 for designating order information at home relating to a second embodiment of the present invention. Because the personal computer 30 and the method for designating the order information are the same as those of the first embodiment, descriptions thereof are omitted.

The camera 40 includes photographing lenses 42, 44, and can record both a silver halide image and an electronic image simultaneously. (Such a camera will be referred to as a "hybrid camera" hereinafter.) When the user put an unillustrated shutter release button of the hybrid camera 40, the optical image of the subject projected by the photographing lens 42 is photoelectrically converted by a CCD (charge-coupled device) 46 and the optical image of the subject projected by the photographing lens 44 is recorded on the negative film 110.

The signal which has been photoelectrically converted by the CCD 46 is subjected to signal processing at a signal processing section 48, and thumbnail image data is generated at an image generating section 50. A thumbnail image is then displayed on a liquid-crystal panel 54 by a displaying section 52 on the basis of the generated thumbnail image data. This allows the user to confirm the photographed images at home, or wherever he/she is. The thumbnail image data is recorded on the IC chip 100 at the control section 22.

When designating the order information, the user connects the personal computer 30 and the hybrid camera 40 via a serial cable and carries out the same operation as described in the first embodiment to designate the order information. The user then removes the cartridge 122 from the hybrid camera 40 and takes it to the DPE shop for simultaneous printing. Because the order information is already recorded on the IC chip 100, the user (the customer) need not designate the order information at the shop.

Since the thumbnail image data is thus recorded on the IC chip 100 during photographing, the customer can confirm the frame images and designate the order information at home even without the frame images having been printed at the laboratory. For example, by designating beforehand that unnecessary frame images need not to be printed, costs can be lowered.

Further, in the first embodiment, the customer must remove the cartridge accommodated within the camera and then load in the camera the cartridge he/she wants to reprint. However, such operations are unnecessary in the present second embodiment since the customer can first designate the order information.

At the time of simultaneous printing, the thumbnail image data (electronic still thumbnail image data) may be recorded on the IC chip 100 after having been rewritten to the thumbnail image data (film thumbnail image data) obtained by reading the negative film 110, or both of these thumbnail image data may be recorded on the IC chip 100. In the latter case, distinguishing codes should be provided in order to be able to distinguish the two types of thumbnail image data.

Figure 7:
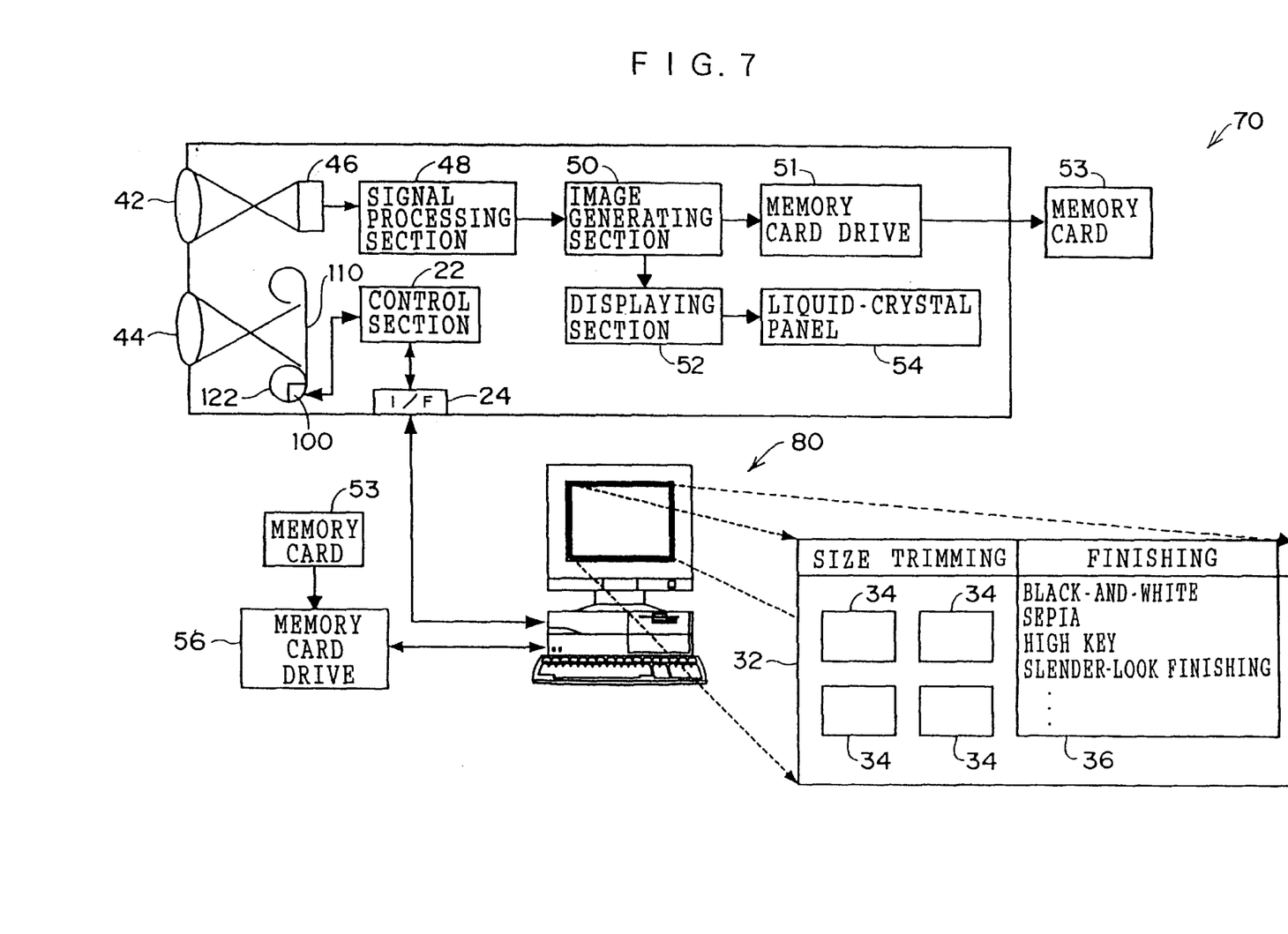
FIG. 7 is a schematic structural view of a camera and a personal computer for designating order information relating to a third embodiment of the invention.

FIG. 7 shows the arrangement of a camera 70 and a personal computer 80 relating to a third embodiment of the present invention. Because the structure of the personal computer 80 is the same as that of the previously-described personal computer 30 except that a memory card drive 56 is provided at the personal computer 80, detailed description thereof is omitted.

The hybrid camera 70 includes the photographing lenses 42, 44 and can record both a silver halide image and an electronic image simultaneously. When a user presses an unillustrated shutter release button of the hybrid camera 70, the optical image of the subject projected by the photographing lens 42 is photoelectrically converted by the CCD 46, while the optical image of the subject projected by the photographing lens 44 is recorded on the negative film 110.

The signal which was photoelectrically converted by the CCD 46 is subjected to signal processing at the signal processing section 48, and thumbnail image data is generated at the image generating section 50. The thumbnail image is then displayed on the liquid-crystal panel 54 by the displaying section 52 on the basis of the generated thumbnail image data. The thumbnail image data is recorded on a memory card 53 by the memory card drive 51, and the date on which the image was photographed is also recorded. This date is also recorded on the IC chip 100 by the control section 22 at this time. The date recorded on the memory card 53 and the date recorded on the IC chip 100 correspond to each other.

When designating the order information, the user connects the personal computer 80 and the hybrid camera 70 via the serial cable, and sets the memory card 53 in which the thumbnail image data is recorded into the memory card drive 56. Then, the user carries out a predetermined operation to fetch the thumbnail image into the personal computer 80 and designates the order information by the order information setting screen 32. The designated order information is then transmitted, together with the thumbnail image data and the photographing date, into the hybrid camera 70 via the serial port of the personal computer 80. The received order information and thumbnail image data are recorded onto the IC chip 100 by the control section 22 of the hybrid camera 70. When recording the order information and the thumbnail image data, the control section 22 collates the photographing date recorded on the IC chip 100 and the photographing date transmitted from the personal computer 80 such that the image recorded on the negative film 110 and the thumbnail image are recorded in correspondence with one another. Therefore, if a different cartridge is loaded in the camera 70, this arrangement can avoid recording the order information and the thumbnail image data on that cartridge by mistake.

For simultaneous printing, the user removes the cartridge 122 from the hybrid camera 70 and takes it to the DPE shop for simultaneous printing. Because the order information is already recorded on the IC chip 100 at this point, the customer need not designate the order information at the shop.

Since the thumbnail image data is thus recorded on the IC chip 100 during photographing, the user can confirm the frame images and designate the order information at home even without simultaneous printing being carried out at the laboratory. This results in lower costs since the user can designate unnecessary frame images beforehand.

Further, instead of the hybrid camera, the customer may set two cameras, a silver salt still camera and an electronic still camera, for synchronized photographing. Then, thumbnail image data is generated from an image photographed by the electric still camera and is transmitted to the personal computer and displayed on the screen. The customer prepares the order information on the basis of the display. The thus produced order information is transmitted to the IC chip set in the cartridge of the silver salt film. In this case, by synchronizing these two cameras and searching for frame images having the same photographing date, the film image and the electronic still image can be reliably matched.

The above-described method is especially effective in a case in which, for example, when photographs are taken at a studio by a professional photographer, a customer refers to electronic still images and selects frame images to be printed.

What is claimed is:

1. An order information recording system comprising:

reading means for reading information, which is required for designating order information, from a storage element which is provided at a cartridge accommodating a photographic photosensitive material and on which the information required for designating order information is recorded in advance;

displaying means for displaying the information required for designating order information, which information was read by said reading means;

setting means for setting order information on the basis of the information required for designating order information, which information required for designating order information is displayed by said displaying means; and order information recording means provided in a camera which records a photographed image on the photographic photosensitive material, the order information recording means recording the order information set by said setting means on the storage element in correspondence with the information required for designating order information, which information required for designating order information is recorded on the storage element.

2. An order information recording system comprising:

reading means for reading information, which is required for designating order information in accordance with an image recorded on a photographic photosensitive material, from a storage element provided at a cartridge which accommodates the photographic photosensitive material;

displaying means for displaying the information required for designating order information, which information was read by said reading means;

setting means for setting order information on the basis of the information required for designating order information, which information required for designating order information is displayed by said displaying means; and recording means provided in a camera which records a photographed image on the photographic photosensitive material, the recording means recording the information required for designating order information and the order information set by said setting means on the storage element in correspondence with the information required for designating order information.

3. An order information recording system comprising:

recording means for recording on a storage medium information required for designating order information in accordance with an image recorded on a photographic photosensitive material;

reading means for reading from the storage medium the information required for designating order information, which information was recorded by said recording means;

displaying means for displaying the information required for designating order information, which information was read by said reading means;

setting means for setting order information on the basis of the information required for designating order information, which information is displayed by said displaying means; and order information recording means provided in a camera which records a photographed image on the photographic photosensitive material, the order information recording means for recording, on a storage element provided at a cartridge accommodating the photographic photosensitive material, the order information set by said setting means together with the information required for designating order information, which information required for designating order information was read by said reading means.

4. An order information recording system according to claim 1, wherein the information required for designating order information is image data corresponding to the image recorded on the photographic photosensitive material.

5. An order information recording system according to claim 2, wherein the information required for designating order information is image data corresponding to the image recorded on the photographic photosensitive material.

6. An order information recording system according to claim 2, wherein said recording means is included in one of a camera which records a photographed image on the photographic photosensitive material and a scanner which reads a photographed image recorded on the photographic photosensitive material, and said recording means photoelectrically converts the photographed image so that the photographed image is recorded as electronic image data.

7. An order information recording system according to claim 3, wherein the information required for designating order information is image data corresponding to the image recorded on the photographic photosensitive material.

8. An order information recording system according to claim 3, wherein said recording means is included in one of a camera which records a photographed image on the photographic photosensitive material and a scanner which reads a photographed image recorded on the photographic photosensitive material, and said recording means photoelectrically converts the photographed image so that the photographed image is recorded as electronic image data.

9. An order information recording system according to claim 4, wherein said recording means is included in one of a camera which records a photographed image on the photographic photosensitive material and a scanner which reads a photographed image recorded on the photographic photosensitive material, and said recording means photoelectrically converts the photographed image so that the photographed image is recorded as electronic image data.

10. An order information recording system according to claim 5, wherein said recording means is included in one of a camera which records a photographed image on the photographic photosensitive material and a scanner which reads a photographed image recorded on the photographic photosensitive material, and said recording means photoelectrically converts the photographed image so that the photographed image is recorded as electronic image data.

11. A photographic image processing method comprising:
a reading step for reading information, which is required for designating order information, from a storage element which is provided at a cartridge accommodating a photographic photosensitive material and on which the information required for designating order information is recorded in advance;
a displaying step for displaying the information required for designating order information, which information was read in said reading step;
a setting step for setting order information on the basis of the information required for designating order information, which information is displayed by said displaying step;
an order information recording step carried out in a camera which records a photographed image on the photographic photosensitive material, the order information recording step for recording the order information set in said setting step onto the storage element in correspondence with the information required for designating order information, which information required for designating order information is recorded on the storage element; and
an image processing step for, on the basis of the recorded order information, processing the image recorded on the photographic photosensitive material.

12. A photographic image processing method comprising:
a recording step carried out in a camera which records a photographed image on a photographic photosensitive material, the recording step recording information, which is required for designating order information in accordance with an image recorded on the photographic photosensitive material, on a storage element provided at a cartridge which accommodates the photographic photosensitive material;
a reading step for reading from the storage element the information required for designating order information, which information was recorded by said recording step;
a displaying step for displaying the information required for designating order information, which information was read in said reading step;
a setting step for setting order information on the basis of the information required for designating order information, which information is displayed by said displaying step;
an order information recording step carried out in the camera, the order information recording step recording the order information set in said setting step onto the storage element in correspondence with the information required for designating order information, which information required for designating order information is recorded on the storage element; and
an image processing step for, on the basis of the recorded order information, processing the image recorded on the photographic photosensitive material.

13. A photographic image processing method comprising:
a recording step for recording on a storage medium information required for designating order information in accordance with an image recorded on a photographic photosensitive material;
a reading step for reading from the storage medium the information required for designating order information, which information was recorded in said recording step;
a displaying step for displaying the information required for designating order information, which information was read in said reading step;
a setting step for setting order information on the basis of the information required for designating order information, which information is displayed by said displaying step;
an order information recording step carried out in a camera which records a photographed image on the photographic photosensitive material, the order information recording step recording, on a storage element provided at a cartridge accommodating the photographic photosensitive material, the order information set in said setting step together with the information required for designating order information, which information required for designating order information was read in said reading step; and
an image processing step for, on the basis of the recorded order information, processing the image recorded on the photographic photosensitive material.

14. A photographic image processing method according to claim 11, wherein the information required for designating order information is image data corresponding to the image recorded on the photographic photosensitive material.

15. A photographic image processing method according to claim 12, wherein the information required for designating order information is image data corresponding to the image recorded on the photographic photosensitive material.

16. A photographic image processing method according to claim 12, wherein said recording step is carried out in one of a camera which records a photographed image on the photographic photosensitive material and a scanner which reads the photographed image recorded on the photographic photosensitive material, and in said recording step, the photographed image is photoelectrically converted and is recorded as electronic image data.

17. A photographic image processing method according to claim 13, wherein the information required for designating order information is image data corresponding to the image recorded on the photographic photosensitive material.

18. A photographic image processing method according to claim 13, wherein said recording step is carried out in one of a camera which records a photographed image on the photographic photosensitive material and a scanner which reads the photographed image recorded on the photographic photosensitive material, and in said recording step, the photographed image is photoelectrically converted and is recorded as electronic image data.

19. A photographic image processing method according to claim 15, wherein said recording step is carried out in one of a camera which records a photographed image on the photographic photosensitive material and a scanner which reads the photographed image recorded .on the photographic photosensitive material, and in said recording step, the photographed image is photoelectrically converted and is recorded as electronic image data.

20. A photographic image processing method according to claim 17, wherein said recording step is carried out in one of a camera which records a photographed image on the photographic photosensitive material and a scanner which reads the photographed image recorded on the photographic photosensitive material, and in said recording step, the photographed image is photoelectrically converted and is recorded as electronic image data.

21. The order information recording system according to claim 1, wherein said setting means sets order information comprising at least one of whether an image is to be printed; finish processing, and template processing of an image.

22. The order information recording system according to claim 2, wherein said setting means sets order information comprising at least one of whether an image is to be printed; finish processing, and template processing of an image.

23. The order information recording system according to claim 3, wherein said setting means sets order information comprising at least one of whether an image is to be printed; finish processing, and template processing of an image.

24. The photographic image processing method of claim 11, wherein said setting step comprises setting order information comprising at least one of whether an image is to be printed; finish processing, and template processing of an image.

25. The photographic image processing method of claim 12, wherein said setting step comprises setting order information comprising at least one of whether an image is to be printed; finish processing, and template processing of an image.

26. The photographic image processing method of claim 13, wherein said setting step comprises setting order information comprising at least one of whether an image is to be printed; finish processing, and template processing of an image.

* * * * *